United States Patent [19]

Eguchi

[11] Patent Number: 4,615,602
[45] Date of Patent: Oct. 7, 1986

[54] APPARATUS FOR ADJUSTING THE POSITION OF A LIGHT SENSING ELEMENT IN A CAMERA

[75] Inventor: Masaharu Eguchi, Tokyo, Japan

[73] Assignee: Canon Kabushiki Kaisha, Tokyo, Japan

[21] Appl. No.: 701,093

[22] Filed: Feb. 13, 1985

[30] Foreign Application Priority Data

Feb. 13, 1984 [JP] Japan ............................... 59-18899[U]

[51] Int. Cl.⁴ ............................................ G03B 7/099
[52] U.S. Cl. .................................... 354/478; 354/288
[58] Field of Search ............... 354/478, 219, 288, 152, 354/476, 477, 408

[56] References Cited

U.S. PATENT DOCUMENTS

| 4,341,448 | 7/1982 | Toyoda et al. | 354/288 |
| 4,391,513 | 7/1983 | Fujiki | 354/408 |
| 4,427,277 | 1/1984 | Haraguchi | 354/476 |
| 4,440,479 | 4/1984 | Nemoto | 354/288 |
| 4,445,765 | 5/1984 | Yamamoto | 354/478 |

Primary Examiner—Russell E. Adams
Attorney, Agent, or Firm—Toren, McGeady, Stanger, Goldberg & Kiel

[57] ABSTRACT

An apparatus for adjusting the position of a light sensing element in a single lens reflex camera which carries out a partial light measurement by forming an image on the surface of the light sensing element with a light beam coming from a certain determined range on the focusing plate of a view finder by means of a condenser lens. The condenser lens and the light sensing element holding member are supported by a pentagonal prism holder and that the holding member is provided with a device for adjusting the position in such a manner that by adjusting the position of the light sensing element along two directions the light sensing element is made to exactly correspond to the light measuring range on the focusing plate.

10 Claims, 5 Drawing Figures

APPARATUS FOR ADJUSTING THE POSITION OF A LIGHT SENSING ELEMENT IN A CAMERA

BACKGROUND OF THE INVENTION

1. Field of the Invention

The present invention relates to an apparatus for adjusting the position of a light sensing element particularly in a single lens reflex camera which carries out a partial light measurement by forming an image on the focusing plate on the surface of the light sensing element by means of a condenser lens.

2. Description of the Prior Art

Until now the camera having this kind of light measuring system normally carries out only the so-called mean light measurement with priority on the central part wherein by keeping the defocus state with intentional deviation of the light sensing surface of the light sensing element from the focusing plate, the distribution of the light sensing ability for the mean light measurement with priority on the central part is obtained. Further, because the sensitivity is not so sharp that it is not necessary to carry out a strict adjustment of the position and possible to obtain the sensitivity distribution without a problem in practice even with an accuracy attainable by a mechanical assembling. FIG. 1 shows a conventional embodiment. 1 is a camera body being provided with a front plate 2 and a mirror box 3. 4 is a pentagonal prism holder provided with a light sensing element supporting part 4′a as one body, being secured on the mirror box 3 by a screw 5. On the light sensing element supporting part 4′a a condenser Fresnel lens 6 is cemented and behind it a light sensing element 7 is inserted and secured by means of an elastic depressing member 8.

In connection with the conventional art, a proposal was made to change the focusing direction of the condenser lens and the distance between the condenser lens and the light sensing surface so as to enable the partial light measurement by bringing the light sensing surface and the focusing plate in the image forming state. Because in this case the accuracy of the position of the light sensing element attained by the conventional mechanical engagement is low, the range for the partial light measurement is not kept at a certain determined position on the focusing plate, and when a display frame of the range for the light measurement is provided, a large deviation takes place between the display frame and the light measuring range so that it is impossible to carry out the light measurement on the part intended by the user of the camera.

As the camera which enables the partial light measurement, "Canon F-1" and so on are known, in which a half permeable mirror is partially put in the condenser lens so as to divide the light beam and carry out the light measurement only on the range. In this case, a certain shadowy part of the view finder caused by the half mirror is used as the light measuring range so that the above-mentioned shortcoming does not take place, while this prior art has problems that the cost becomes high, a part of the view finder becomes a little dark, and thus prior art is not suited for developing a series of cameras of different grades having a common basic construction because the camera applicable to the prior art is fundamentally different in construction from the conventional one which carries out only the mean light measurement with priority on central part.

It is, accordingly, an object of the present invention to provide an apparatus for adjusting the position of the light sensing element most suited for cameras capable of the partial light measurement free from the above-mentioned conventional shortcomings without largely changing the fundamental composition of the conventional camera.

SUMMARY OF THE INVENTION

Thus, according to the present invention, the condenser lens and the light sensing element holding means are supported by the pentagonal prism holder and the holding member is provided with the apparatus for adjusting the position in such a manner that by adjusting the position of the light sensing element along two directions the light sensing element is adjusted in position.

Below, an embodiment of the present invention will be described in detail with reference to the accompanying drawings.

BRIEF DESCRIPTION OF THE DRAWINGS

FIG. 3(a) shows a plan view, while FIG. 3(b) shows a side view.

DETAILED DESCRIPTION OF THE PREFERRED EMBODIMENT

Figure 2:
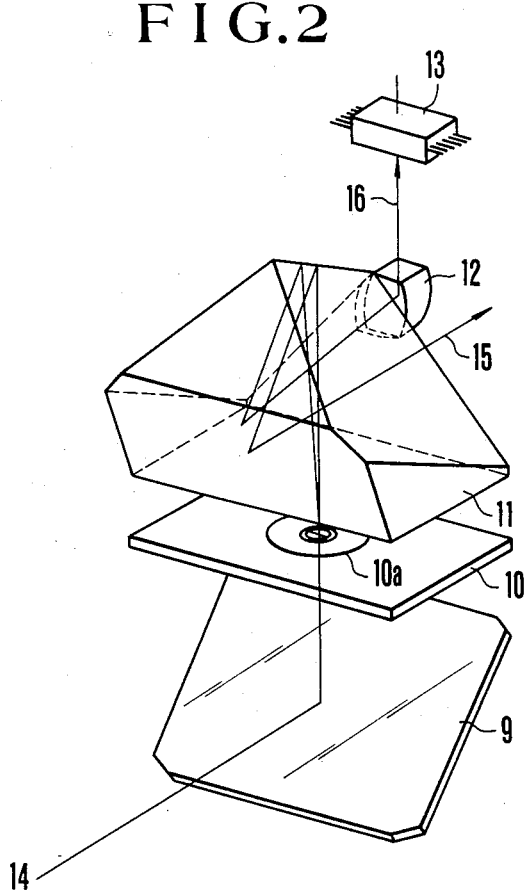
FIG. 2 shows a sketch of the optical system in the embodiment of the present invention.

FIG. 2 shows an outline of the arrangement of the optical system in an embodiment of the present invention. In the drawing, 9 is a 45° mirror and 10 is a focusing plate having a frame 10a showing the partial light measuring range. 11 is a pentagonal prism, 12 is a prism lens having an image forming lens and a totally reflecting plane as a whole and 13 is a light sensing element.

The light beam incident along an optical axis 14 of the photographing lens forms an image on the focusing plate 10 having a light diverging character, which image is observed through an eyepiece lens (not shown) provided on an optical axis 15 of the view finder.

The image on the focusing plate 10 is led upwards via the prism lens 12 from the rear plane of the pentagonal prism as is shown along a light sensing optical axis 16 and is again formed on the light sensing plane of the light sensing element 13.

Figure 3A:
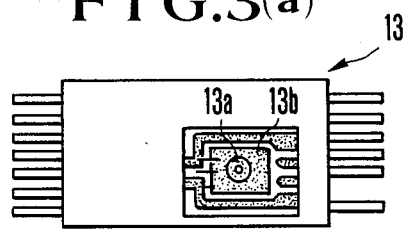
FIGS. 3(a) and 3(b) show the light sensing element to be used in the embodiment, whereby
Figure 3B:
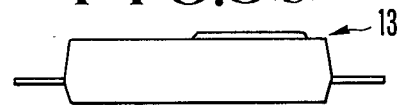

FIGS. 3(a) and 3(b) respectively show a plan view and a side view of the light sensing element used in the embodiment. The light sensing plane is divided into the central part 13a and the circumferential part 13b, whereby only the circumferential part 13b is used for the partial light measurement. The light measuring range corresponds to the light measuring range frame 10a and the circumferential part 13b are used for the light measurement with priority on the central part. It is possible to change over both light measuring ranges instantly by the electrical switching.

Figure 1:
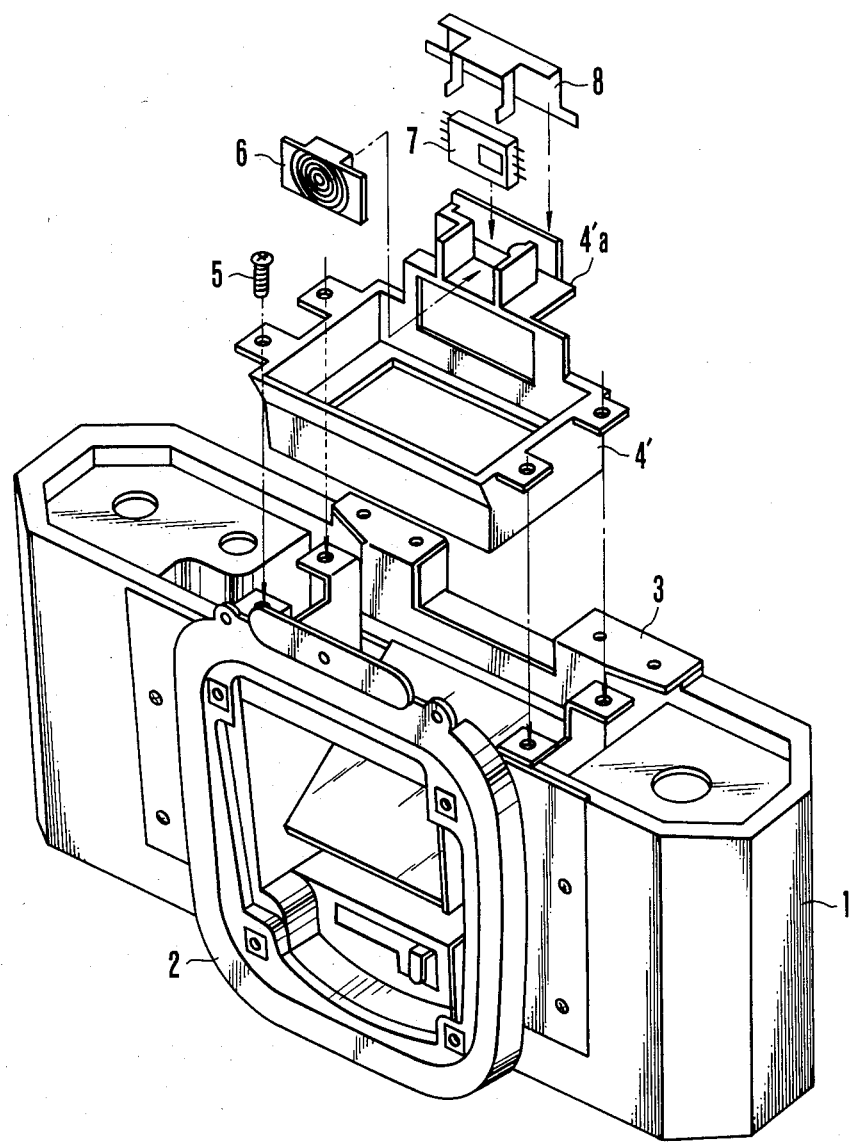
FIG. 1 shows the conventional embodiment in perspective view.
Figure 4:
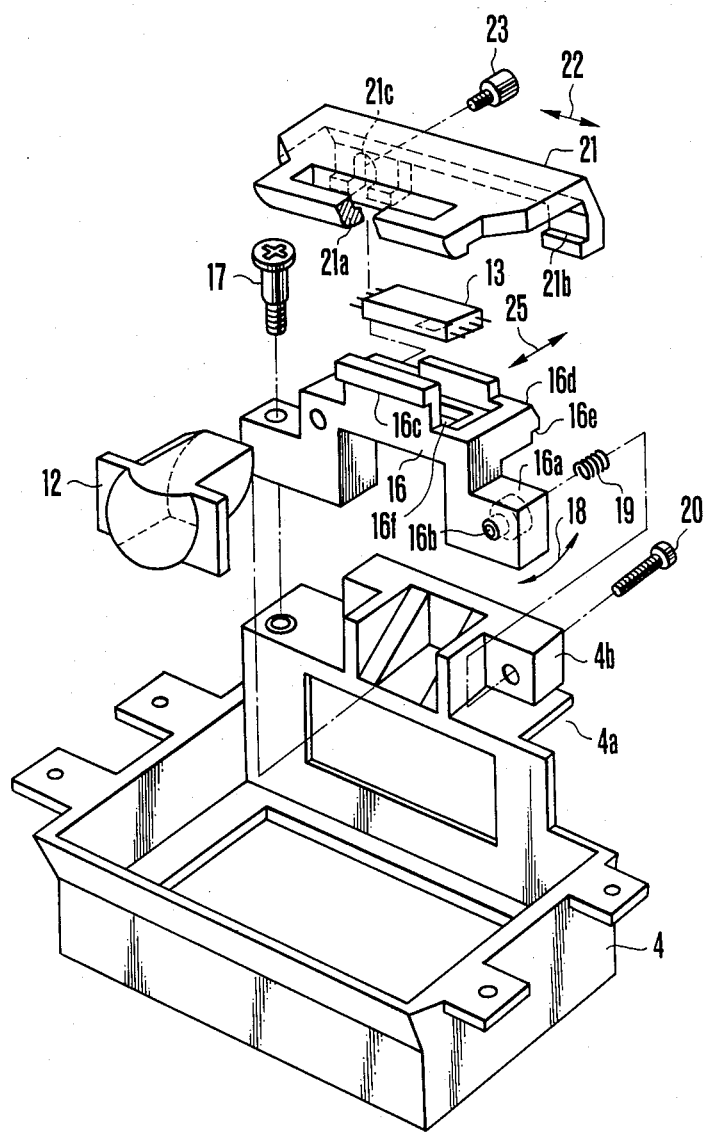
FIG. 4 shows the mechanical construction of the embodiment in perspective view.

FIG. 4 shows the mechanical construction of the light measuring unit in the embodiment, designed in such a manner that by simply replacing the pentagonal prism holder of the camera of the conventional construction shown in FIG. 1 and the light measuring system provided on it with the unit shown in FIG. 4 the system can easily be converted into a camera capable of a partial light measurement.

A light sensing element holder 16 is supported with the one end on the supporting part 4a by means of a shaft 17, while the other end is provided with a spot faced part 16a and a screw hole 16b and can be rotated around the shaft 17 along the direction of an arrow 18 by rotating a screw 20 piercing the hole of the rising part 4b and secured in the screw hole 16b via an adjusting spring 19.

A fixing element 21 for light sensing element 13 has a spot faced part (now shown) for positioning the contour at the side of the non-light sensing plane of the light sensing element 13 after positioning the light sensing element is secured by cementing with the light sensing plane directed downwards.

The fixing element 21 on which the light sensing element 13 is mounted is fixed slidably along the direction of an arrow 22 with reference to the holder 16 in such a manner that by depressing the fixing element 21 downwards after an engaging projection 21a provided at the lower part has been engaged with the projection 16c of the holder 16 the engaging parts 21b provided at the right and the left are electrically engaged with the stepped part 16e beyond the inclined part 16d provided on the holder.

In this way, the light sensing plane of the light sensing element 13 becomes ready to sense the light through the opening 16f coming from the prism lens 12. At the back of the light sensing element holder 16 an eccentric pin 23 is rotatably arranged in advance by screwing or calking in such a manner that at the time of arranging the fixing element 21, the eccentric pin 23 is engaged in the notch 21c. By rotating the adjusting screw 20 from the back of the camera in order to adjust the position of the light sensing element 13 the holder 16 rotates around the shaft 17 along the direction of the arrow 18, whereby the fixing element 21 also rotates in such a manner that the position of the light sensing plane of the light sensing element 13 is finely adjusted forwards or backwards with reference to the prism lens 12. Further, by rotating the eccentric pin 23 from the back of the camera in the same way the light sensing element fixer 21 is moved along the direction of the arrow 22, while the holder 16 remains in such a manner that the light sensing plane of the light sensing element 13 is finely adjusted.

In the case of the embodiment the adjustment on the secondary image forming plane of the light sensing plane is carried out by the combination of the rotation and the sliding, the reason for which is that the rotation angle around the shaft 17 by means of the adjusting screw 20 is too small to influence the distribution of the light sensing ability in practice so that the straight movements along the two directions perpendicular to each other of the arrow 25 are substituted with the above in an approximate way, whereby it goes without saying that the adjustment can also be made by the straight movements along the two directions. In this case, the construction consisting of a spring and an adjusting screw used for the adjustment by rotation in the embodiment are simply arranged at the both sides of the prism lens. Further, at this time it is necessary to adjust the right and the left adjusting screws synchronously.

Further, the light measuring system supporting part 4a is hereby composed as one body with the pentagonal prism holder 4, whereby it also belongs to the gist of the present invention to compose it separately or as one body with the existing part such as the eyepiece lens. Further, it also goes without saying that the light sensing element holder 16 or the fixing element of the light sensing element may be composed of a plural number of parts.

According to the present invention by providing each one adjusting efficiency with one freedom between the light sensing system support part and the fixing element of the lignt sensing element on which the light sensing holder and the light sensing element are fixed as one body as stated above, it is possible to realize an adjustment with two freedoms with a smooth and simple composition, which contribute much to the economy and the fidelity of the adjustment. Further, without largely changing the fundamental composition of the light measuring system of the conventional camera which carries out only the mean light measurement with priority on the central part with the composition shown in FIG. 1, it is possible to realize the partial light measuring efficiency without enlarging the space so much, which does not hinder the serial development of the camera, which is advantageous.

Further, as is clear from the embodiment, it is possible to effect the adjustment with two freedoms from the back of the camera so that the flexible circuit plate and so on normally occupying the upper surface of the pentagonal prism does not offer any problem, while it is very effective for the adjustment work, whereby it goes without saying that it is quite convenient for automatizing the adjustment.

What is claimed is:

1. An apparatus for adjusting the position of a light sensing element in a single lens reflex camera having a pentagonal prism into which a light beam is conducted through a photo-taking optical system and a light sensing element for receiving the output light beam being emitted from the pentagonal prism, comprising:
    (a) a light sensing plane defined by the light sensing element, said light sensing plane extending in a direction perpendicular to the optical axis of the light beam emitted from the pentagonal prism;
    (b) a first holding member for holdng the light sensing element in a holding plane of the light sensing element;
    (c) a second holding member for holding said first holding member, said second holding member holding said first holding member so as to be movable in a linear direction in its holding plane;
    (d) said second holder member having first and second ends, said first end supported on a shaft connected to holding means for holding the pentagonal prism, and first adjusting means for effecting an adjusting movement of said second holding nember, said first adjusting means provided at said second end on a side facing a rear plane of the pentagonal prism; and
    (e) second adjusting means provided at a side of the first holding member facing a rear plane of the pentagonal prism, said second adjusting means effecting the movement of said first holding member over said second holding member.

2. An apparatus for adjusting the position of a light sensing element according to claim 1, wherein said light sensing element can effect a partial light measurement.

3. An apparatus for adjusting the position of a light sensing element in a single lens reflex camera having a pentagonal prism into which a light beam is conductd throught a photo-taking optical system and a light sensing element for receiving the output light beam being emitted from the pentagonal prism, comprising:

(a) a light sensing plane defined by the light sensing element, said light sensing plane extending in a direction perpendicular to the optical axis of the light beam emtted from the pentagonal prism;

(b) a first holding member for holding the light sensing element, and a second holding member for holding said first holding member;

(c) first operating means for moving said first holding member in one direction over said light sensing element plane, said first operating means comprising an operating member for said first holding member provided at a side facing a rear plane of the pentagonal prism; and (d) second operating means provided at a side facing the rear plane of the pentagonal prism for moving said second holding member in another direction different from said one direction over said light sensing element plane.

4. An apparatus for adjusting the position of a light sensing element according to claim 3, wherein said first holding member is slidably mounted on said second holding member, and said first operating means for adjusting the position of the light sensing element is a rotatable eccetric pin insertedly fitted into a notched groove of said first holding nember.

5. An apparatus for adjusting the position of a light sensing element according to claim 3, wherein said second holding member has first and second ends, said second operating means comprising a shaft at said first end and a screw provided at said second end, said second holding member being rotated about said shaft by a rotation of said screw for adjusting the position of the light sensing element.

6. An apparatus for adjusting the position of a light sensing element according to claim 3, wherein the light sensing element can effect a partial light measurement.

7. An apparatus for adjusting the position of a light sensing element in a single lens reflex camera having a pentagonal prism into which a light beam is conducted through a photo-taking optical system and a light sensing element for receiving the output light beam being emitted from the pentagonal prism, the light sensing element being capable of effecting a partial measurement, comprising:

(a) a light sensing plane defined by the light sensing element, said light sensing plane extending in a direction perpendicular to the optical axis of the light beam emitted from the pentagonal prism;

(b) a first fholding member for holding the light sensing element and a second holding member for holding said first holding member;

(c) first operating means for moving said first holding member in one direction over said light sensing element plane, said first operating means comprising an operating member for said first holding member provided at a side facing a rear plane of the pentagonal prism; and (d) second operating means provided at a side facing the rear plane of said pentagonal prism for moving said second holding member in an other direction different from said direction over said light sensing plane.

8. An apparatus for adjusting the position of a light sensing element in a single lens reflex camera having a pentagonal prism in which a light beam is conducted through a photo-taking optical system and a light sensing element for receiving the output light beam being emitted from the pentagonal prism, comprising:

(a) a first holding member for holding said light sensing element and a second holding member for holding said first holding member;

(b) first operating means for moving said first holding member in one direction over said light sensing element plane, said first operating means comprising an operating member for said first holding member provided at a side facing a rear plane of said pentagonal prism; and (c) second operating means provided at a side facing the rear plane of the pentagonal prism for moving said second holding member in another direction different said one direction over said light sensing element plane.

9. An apparatus for adjusting the position of a light sensing element according to claim 8, wherein said first holding member is slidably mounted on said second holding member, and said first operatimg means for adjusting the position of the light sensing element includes a rotatable eccentric pin insertedly fitted into a notched groove of said first holding member.

10. An apparatus for adjusting a position of a light sensing element according to claim 8, wherein said second holding member has first and second ends, said second operating means comprising a shaft at said first end and a screw provided at said second end, said second holding member being rotated about said shaft by a rotation of said screw for adjusting the position of the light sensing element.

* * * * *